F. E. JOHNSON.
AUTOMOBILE.
APPLICATION FILED OCT. 24, 1914. RENEWED DEC. 13, 1920.
1,424,412.
Patented Aug. 1, 1922.
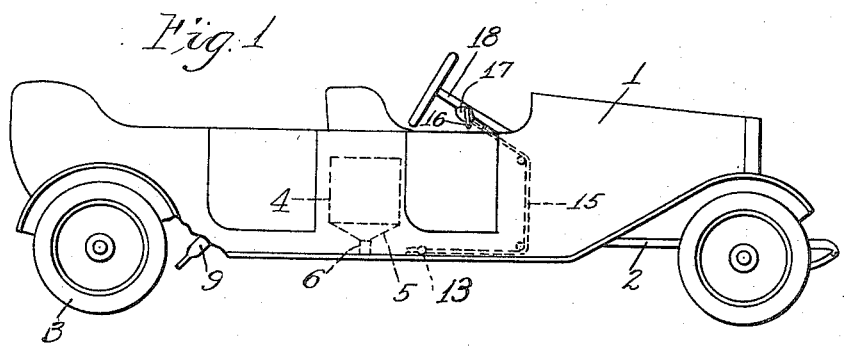
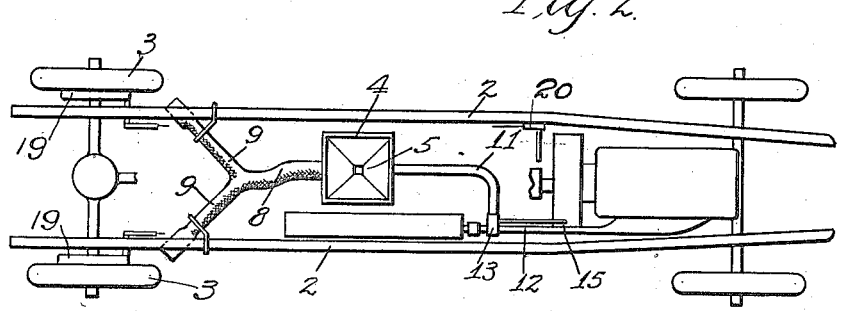
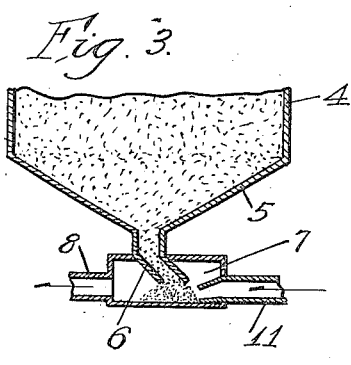
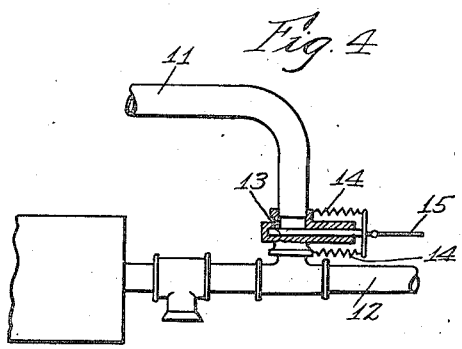

UNITED STATES PATENT OFFICE.

FRANK E. JOHNSON, OF CHICAGO, ILLINOIS.

AUTOMOBILE.

1,424,412.  Specification of Letters Patent.  Patented Aug. 1, 1922.

Application filed October 24, 1914, Serial No. 868,378. Renewed December 13, 1920. Serial No. 430,557.

*To all whom it may concern:*

Be it known that I, FRANK E. JOHNSON, a citizen of the United States, residing at Chicago, in the county of Cook and State of Illinois, have invented a certain new and useful Improvement in Automobiles, of which the following is a specification.

This invention relates to controlling devices for automobiles. When automobiles are running on smooth pavements, and particularly pavements that are also wet, it is difficult to stop them within a short distance even by applying the emergency brakes because the wheels slide on wet pavements like a sled. This sliding of automobiles on wet pavements is the cause of numerous accidents, as the driver is unable to judge in what distance he can stop his car and short stops are made impossible.

When the surface over which the car is passing is wet or slick, the car is also liable to skid and thereby strike obstacles and cause accidents.

One of the objects of my invention is to provide means for obviating these difficulties and permitting the automobile to be stopped easily and quickly, and within a short distance and to be brought under the control when skidding.

In carrying out my invention I use friction material such as sand, and in view of the fact that it is used to stop the sliding or skidding of the car, the device must be reliable at all times, for its use is an emergency use and hence reliability and a proper flow of the friction material is absolutely essential to a commercial device. By means of my invention this reliability is secured. The invention is illustrated in the accompanying drawings wherein:

Figure 1 is a side view of an automobile embodying the invention;

Figure 2 is a plan view of the automobile shown in Figure 1 with the body removed;

Figure 3 is an enlarged sectional view of the bottom of the sand receptacle and the pipe leading thereto and therefrom;

Figure 4 is an enlarged view showing the connection between the pipe which runs to the sand receptacle and the exhaust pipe of the engine.

Like numerals refer to like parts throughout the several figures.

Referring now to the drawings, I have shown an automobile provided with a body 1, a frame or chassis, 2, and the driving wheels 3. Some means is associated with the driving wheels for supplying a friction material to the surface beneath them, such for example, as sand, so that when the car skids the friction material will permit it to be brought under control of the operator, and when the brakes are applied this friction material will increase the friction between the wheels and the surface on which they rest so as to secure the proper braking action, thereby insuring the proper stopping of the automobile.

As illustrated in the drawing this friction material such as sand, is contained in a receptacle 4, preferably located under the seat so that it is easily accessible for filling, etc. This receptacle is preferably provided with an inclined bottom 5, and a discharge pipe 6, which leads from the receptacle into the drying chamber 7. The discharge pipe 6 is arranged so that only a comparatively small amount of the sand will enter the drying receptacle, leaving a portion of said receptacle free from the sand. This result may be secured in any desired manner, as by bringing the discharge pipe near the bottom of the receptacle so that the angle of repose stops the flow of sand and the required amount passes from the receptacle. This permits the sand in the drying receptacle and the end of the discharge pipe 6 to be surrounded by an air space. A pipe 8 leads from the receptacle 4 and is provided with branch pipes 9 by means of which the sand is conveyed to the driving wheels 6 of the automobile. The pipes 9 are preferably flexible steel pipes so that they may be bent to conform to automobiles of different makes thereby permitting the discharge ends of the pipes to be brought in the proper position to discharge the sand under the wheels. Connected with the drying receptacle 7 is a pipe 11, which is connected with the exhaust pipe 12 of the engine, a suitable controlling valve 13 is provided for controlling the pipe 11. When the valve 13 is open the exhaust from the engine passes through the pipe 11 to the drying receptacle 7 and there performs two functions,—one that of heating the sand and the other of forcibly discharging the dried sand through the pipes 8 and 9 so as to discharge it beneath the wheels. It will be seen that by having the sand in the receptacle 7 surrounded by an air space and by having the discharge pipe projecting therein, the hot gases from the engine dry the sand and insures its proper discharge under the wheels. One of the difficulties with using sand is that it contains moisture and does not flow properly, and while this defect is not so important where sand is used to start devices such as locomotors, it is of vital importance in the present case to have the device act properly every time it is used for otherwise an accident is liable to occur.

It will be seen that when the exhaust passes into the drying receptacle 7 it heats the pipes 6 and the lower end of the receptacle thereby insuring the drying of the sand as the gas which forces out the charge of sand for immediate use is also utilized to dry the sand above it which will be subsequently used. It will be seen that by this construction the proper dryings of sand is secured, hence its proper flow at all times beneath the wheels is also assured.

The valve 13 may be of any desired form. I have illustrated it as a gate valve having retracting springs 14, the valve being controlled by a flexible controlling piece 15, connected with a controlling lever 16 on a quadrant 17, associated with the steering post 18.

I have illustrated diagramatically a brake mechanism for the rear wheels of the automobile. This brake mechanism is shown as an ordinary strap brake 19, associated with each driving wheel and controlled by a suitable lever 20.

I claim:

1. The combination with an automobile of a controlling device comprising a sand receptacle, a discharge therefor, a drying chamber into which said discharge projects, the end of said discharge being open and being located intermediate the top and bottom of said drying receptacle so that as the sand is discharged into the drying receptacle, the angle of repose thereof limits the amount of sand entering the drying receptacle to an amount that only partially fills the chamber so that there is an air space in said chamber, pipes leading from said drying chamber to the driving wheels of the automobile, and a connection between said drying chamber and the exhaust pipe of the engine and means for controlling said latter connection whereby the sand may be dried and forced under the wheels by the exhaust gases from the engine.

2. The combination with an automobile of a controlling device comprising a sand receptacle, a discharge therefor, a drying chamber into which said discharge projects, said discharge communicating with said drying chamber, a connection between said drying chamber and the exhaust pipe of the engine, means for controlling said connection and pipes leading from said drying chamber to points in proximity with the wheels of the automobile whereby said exhaust gases from the engine are used to dry the sand and force it under the wheels.

3. The combination with an automobile of a controlling device comprising a sand receptacle, a discharge therefor, a drying chamber into which said discharge projects, said discharge communicating with said drying chamber, a connection between said drying chamber and the exhaust pipe of the engine, means for controlling said connection and pipes leading from said drying chamber to points in proximity with the wheels of the automobile whereby said exhaust gases from the engine are used to dry the sand and force it under the wheels, means for limiting the quantity of sand flowing into said drying chamber so that said sand and a portion of the discharge from the sand receptacle will be surrounded by an air space.

4. The combination with an automobile of a controlling device comprising a sand receptacle, a drying chamber at the discharge of said sand receptacle, a connection between said drying chamber and the exhaust pipe of the engine of the automobile, whereby the heat from the exhaust gases is utilized to dry the sand, and pipes leading to the driving wheels of the automobile and connected with said drying chamber, so that the exhaust gases passing through said drying chamber will force the sand through said pipes to a position in front of said wheels.

In testimony whereof, I affix my signature in the presence of two witnesses this 19th day of October, 1914.

FRANK E. JOHNSON.

Witnesses:
MINNIE M. LINDENAU,
IRENE A. COON.